US011893587B2

(12) United States Patent
Kurian et al.

(10) Patent No.: US 11,893,587 B2
(45) Date of Patent: Feb. 6, 2024

(54) SYSTEM FOR ENHANCED AUTHENTICATION USING NON-FUNGIBLE TOKENS (NFTS)

(71) Applicant: BANK OF AMERICA CORPORATION, Charlotte, NC (US)

(72) Inventors: Manu Jacob Kurian, Dallas, TX (US);
Carl Parziale, Charlotte, NC (US);
David Smiddy, Chadds Ford, PA (US);
Harold Joseph Kennedy, Winter Park, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 174 days.

(21) Appl. No.: 17/547,997

(22) Filed: Dec. 10, 2021

(65) Prior Publication Data

US 2023/0186309 A1 Jun. 15, 2023

(51) Int. Cl.
| | | |
|---|---|---|
| *G06Q 20/40* | (2012.01) | |
| *G06Q 20/02* | (2012.01) | |
| *G06Q 20/38* | (2012.01) | |
| *H04L 9/40* | (2022.01) | |

(52) U.S. Cl.
CPC ......... *G06Q 20/4016* (2013.01); *G06Q 20/02* (2013.01); *G06Q 20/389* (2013.01)

(58) Field of Classification Search
None
See application file for complete search history.

(56) References Cited

U.S. PATENT DOCUMENTS

| | | | |
|---|---|---|---|
| 7,487,123 | B1 | 2/2009 | Keiser et al. |
| 7,778,915 | B2 | 8/2010 | Angle et al. |
| 7,895,112 | B2 | 2/2011 | Richmann et al. |
| 7,921,051 | B2 | 4/2011 | Serkin et al. |
| 7,933,827 | B2 | 4/2011 | Richmann et al. |
| 7,974,907 | B2 | 7/2011 | Miller et al. |
| 8,132,005 | B2 | 3/2012 | Tarkkala et al. |
| 8,190,893 | B2 | 5/2012 | Benson et al. |
| 8,244,622 | B2 | 8/2012 | Hughes, Jr. et al. |
| 8,386,362 | B2 | 2/2013 | Failla et al. |
| 8,412,952 | B1 | 4/2013 | Ramzan et al. |
| 8,606,685 | B2 | 12/2013 | Keiser et al. |

(Continued)

*Primary Examiner* — Mike Anderson
*Assistant Examiner* — Bhavin D Shah
(74) *Attorney, Agent, or Firm* — Moore & Van Allen PLLC; James C. Edwards

(57) ABSTRACT

Enhanced authentication at resource event apparatuses of a card device and, in some instances, the user of the card device. Card device-specific Non-Fungible Tokens (NFTs) are generated and, in some instance, user credential-specific NFTs are generated. The NFTs are stored within a distributed ledger of a distributed trust computing network, which provides verification as the uniqueness and authenticity of the NFTs. Once a resource event is initiated at a resource event apparatus, card device-related information and, in some instance, user credential-related information is received, and the information is compared to the corresponding NFT as a means of authenticating the card device and, in some instances, the card device and the linked user of the card device. As a result, the use of imitation card devices is prevented and, in some instances, the identity of the user of the card device is authenticated and deemed to be linked to the card device.

19 Claims, 7 Drawing Sheets

(56) References Cited

U.S. PATENT DOCUMENTS

| | | |
|---|---|---|
| 2010/0228674 A1 | 9/2010 | Ogg et al. |
| 2010/0250447 A1 | 9/2010 | Hughes et al. |
| 2011/0231913 A1 | 9/2011 | Feng et al. |
| 2013/0061049 A1 | 3/2013 | Irvine |
| 2013/0238478 A1 | 9/2013 | Bruno |
| 2013/0238903 A1 | 9/2013 | Mizunuma |
| 2013/0254052 A1 | 9/2013 | Royyuru et al. |
| 2014/0280476 A1 | 9/2014 | Chiussi et al. |
| 2014/0344015 A1 | 11/2014 | Puertolas-Montanes et al. |
| 2015/0120567 A1 | 4/2015 | Van Rooyen et al. |
| 2020/0273048 A1* | 8/2020 | Andon ................. G06Q 20/045 |
| 2021/0256070 A1* | 8/2021 | Tran ................. G06F 16/90332 |

* cited by examiner

SYSTEM FOR ENHANCED AUTHENTICATION USING NON-FUNGIBLE TOKENS (NFTS)

FIELD OF THE INVENTION

The present invention is generally related to network authentication and, more specifically, authenticating a card device and the user of the card device at resource event apparatuses through the use of card device non-fungible tokens (NFTs) and user identification credential NFTs.

BACKGROUND

The nefarious use of skimmer devices at Automated Teller Machine (ATM), point-of-sale (POS) devices and the like has become more prevalent. A skimmer device is disguised to look like part of the ATM or POS devices and is used to read the information stored on the card device as it is inserted into or swiped at the ATM or POS device. In addition, skimmer devices have been employed that have the capability to capture the user's Personal Identification Number (PIN). Once the wrongdoer has possession of the card device information and/or PIN, the wrongdoer may generate imitation card devices that can readily be user by the wrongdoers at the ATM or POS device. Currently, minimal to no means exist to be able to detect imitation card devices once they are inserted into or swiped at a resource event apparatus (e.g., card reader device).

Moreover, user authentication at a resource event apparatus, such as an ATM, POS device or the like, typically occurs by the user providing authentication credentials, such as a Personal Identification Number (PIN), a signature or the like. However, such authentication credentials may easily be either wrongfully possessed or replicated by a wrongdoer.

Therefore, a need exists to develop systems, methods, computer program products and the like that provide for a heightened level of authentication at a resource event apparatus, such as ATMS, POS devices and the like. Specifically, the authentication mechanisms should provide for verifying the authenticity of the card device itself to prevent against the use of imitation/bogus card devices at resource event apparatuses. Moreover, the authentication mechanisms should provide for verifying the identity of the card device user beyond conventional means, such as user presentation of authentication credentials, such as a PIN, phot identification, signature or the like.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for enhanced authentication of the card device and, in some embodiments of the invention, the user of the card device at resource event apparatuses, such as Automated Teller Machines (ATMs), Point-of-Sale (POS) devices and the like. Specifically, the invention relies on generating card device-specific Non-Fungible Tokens (NFTs) and, in some embodiments of the invention user credential-specific NFTs. Since the NFTs are stored within a distributed ledger of a distributed trust computing network, the NFTs are verified, through consensus reached by nodes, as being authentic and unique.

Card device-specific NFTs may be generated using, as the input to the hash algorithm(s), one or more of (i) an image of at least one facing of the card device, (ii) unique computer-readable indicia displayed on a portion of a facing of the card device and/or (iii) card-related information (e.g., information accessible through inserting or swiping the card device at a resource event apparatus), such as user identifier, account identifier or the like. Subsequently, when the card is inserted into or swiped at a resource event apparatus, the card device-related information used to generate the card-device-specific NFT is received by performing at least one (i) capturing or receiving an image of the facing of card device, (ii) reading the unique computer indicia and/or (iii) reading or accessing the card-related information stored on an embedded chip or magnetic strip of the card device or a digital wallet of a mobile device in possession of the user. Once the card device-related information is received at the resource event apparatus, the distributed trust computing network is accessed to determine if a match exists between device-related information and the card device-specific NFT. If a match is determined to exist, the card device is deemed to be authenticated, while if no match is determined to exist, the user is denied from processing further events at the resource event apparatus.

In further embodiments of the invention, the authentication is a dual authentication of both the card device and the user of the card device. In such embodiments of the invention, once the card device is assigned to a user, a user credential-specific NFT is generated using, as the input to the hash algorithm(s), one or more of (i) an image of the user, (ii) an image of a facing of user credentials (e.g., a driver's license, passport or the like) and/or (iii) information displayed on the user credentials (e.g., name, address, driver's license number, passport number or the like) and linked to the card device-specific NFT. Subsequently, at the resource event apparatus, user-credential information is received by performing one or more of (i) capturing or receiving an image of the user, (ii) capturing or receiving an image of a facing of the user credentials and/or (iii) receiving user credential information. Once the card device has been authenticated (i.e., once a determination is made that the card-device information matches the card device-specific NFT), the distributed trust computing network is accessed to determine if a match exists between the user credential information and a user credential-specific NFT (i.e., whether a user credential-specific NFT exists for the user credential information) and, if so, whether the user credential-specific NFT is linked to the card-device-specific NFT. If a match and link is determined to exist, the user is deemed to be authenticated and allowed to process/conduct resource events and the resource event apparatus, while if no match or no link is determined to exist, the user is denied from processing further events at the resource event apparatus.

A system for enhanced authentication at a resource event apparatus defines first embodiments of the invention. The system includes a distributed trust computing network including a plurality of decentralized nodes, each decentralized node configured to store at least a portion of a distributed ledger including a plurality of data blocks. The system additionally includes a first computing platform having a first memory and at least one first processing device in communication with the first memory. The first memory stores a non-fungible token generation sub-system that includes first instructions that are executable by the at least one first processing device. The first instructions are configured to, in response to producing a card device configured for executing resource events, generate a first non-fungible token (NFT) associated with the card device, and communicate the first NFT to the distributed trust computing network. In response to the distributed trust computing network receiving the first NFT, the decentralized nodes of the distributed trust computing network are configured to (i) reach a consensus on the first NFT to verify an authenticity of the first NFT, and (ii) generate a data block, within the distributed ledger, that stores the verified first NFT.

The system additionally includes a second computing platform having a second memory and at least one second processing device in communication with the second memory. The second memory stores an authentication sub-system that includes second instructions that are executable by the at least one second processing device. The second instructions are configured to, in response to a user presenting the card device at a resource event apparatus, receive first NFT-related information from at least one of (i) the card device, or (ii) a digital wallet of the user and determine whether the first NFT-related information matches the first NFT stored on the distributed ledger of the distributed trust computing network. In response to determining that the first NFT-related information matches the first NFT stored on the distributed ledger of the distributed trust computing network, the second instructions are configured to authenticate the card device. In response to determining that the first NFT-related information does not match the first NFT stored on the distributed ledger of the distributed trust computing network, the second instructions are configured to deny the user from conducting resource events at the resource event apparatus using the card device.

In specific embodiments of the system, the first instructions configured to generate the first NFT associated with the card device are further configured to generate the first NFT by using, as an input to a hash algorithm, an image of the card device. In such embodiments of the system, the second instructions configured to receive first NFT-related information from the card device are further configured to capture an image of at least one facing of the card device, the image of the facing of the card device defining the first NFT-related information.

In other specific embodiments of the system, the first instructions configured to generate the first NFT associated with the card device are further configured to generate the first NFT by using, as an input to a hash algorithm, computer-readable indicia displayed on a facing of the card device. In such embodiments of the system, the second instructions configured to receive first NFT-related information from the card device are further configured to read the computer-readable indicia displayed on the facing of the card, the computer-readable indicia defining the first NFT-related information.

In still further specific embodiments of the system, the first instructions configured to generate the first NFT associated with the card device are further configured to generate the first NFT by using, as an input to a hash algorithm, user information associated with the card device. In such embodiments of the system, the second instructions configured to receive first NFT-related information from the card device are further configured to read the user information from an embedded chip or magnetic strip of the card device.

Moreover, in further specific embodiments of the system, the second instructions configured to receive first NFT-related information from the digital wallet are further configured to receive the first NFT-related information via wireless communication between a mobile device including the digital wallet and the resource event apparatus.

In additional specific embodiments of the system, the first instructions are further configured to, in response to issuing the card device to the user, generate a second non-fungible token (NFT) that is (i) associated with identification of the user and (ii) linked to the first NFT, communicate the second NFT to the distributed trust computing network. In response to the distributed trust computing network receiving the second NFT, the decentralized nodes of the distributed trust computing network are configured to (i) reach a consensus on the second NFT to verify an authenticity of the second NFT, and (ii) generate a data block, within the distributed ledger, that stores the second NFT. In related embodiments of the system, the second instructions are further configured to receive, at the resource event apparatus, second NFT-related information from the user. In response to determining that the first NFT-related information matches the first NFT stored on the distributed ledger of the distributed trust computing network, the second instructions are configured to determine that (i) the second NFT-related information matches the second NFT and (ii) the second NFT is linked to the first NFT, and, in response to determining (i) and (ii), authorize the user to conduct resource events at the resource event apparatus using the card device. In such embodiments of the system, the first instructions configured to generate the second NFT may be further configured to generate the second NFT by using an image of the user as an input to the hash algorithm, and the second instructions configured to receive second NFT-related information from the user are further configured to capture an image of the user, the image of the user defining the second NFT-related information. In other such embodiments of the system, the first instructions configured to generate the second NFT are further configured to generate the second NFT by using, as an input to the hash algorithm, at least one of an image of user identification credential or information included within the user identification credential, and the second instructions configured to receive second NFT-related information from the user are further configured to capture or receive an image of the user identification credential, the image of the user identification credential defining the second NFT-related information.

In other specific embodiments of the system, the second instructions are further configured to communicate resource event-related information to the distributed trust computing network. The resource event-related information includes at least (a) the first NFT-related information, (b) card device authentication approval/denial status, and (c) resource event approval/denial status. In response to the distributed trust computing network receiving the resource event-related information, the decentralized nodes of the distributed trust computing network are configured to (i) reach a consensus on the resource event-related information to verify an authenticity of the resource event-related information, and (ii) generate a data block, within the distributed ledger, that stores the verified resource event-related information and is linked to the first NFT. In related embodiments of the system, the second instructions are further configured to communicate resource event-related information to the distributed trust computing network. The resource event-related information includes at least (a) the first NFT-related information and the second NFT-related information, (b) card device authentication approval/denial status, (c) user authentication approval/denial status, and (d) resource event approval/denial status. In response to the distributed trust computing network receiving the resource event-related information, the decentralized nodes of the distributed trust computing network are configured to (i) reach a consensus on the resource event-related information to verify an authenticity of the resource event-related information, and (ii) generate a data block, within the distributed ledger, that stores the verified resource event-related information and is linked to the first NFT.

A computer-implemented method for enhanced authentication at a resource event apparatus defines second embodiments of the invention. The computer-implemented method is executed by one or more processing devices. The method includes, in response to producing a card device configured for executing resource events, generating a first non-fungible token (NFT) associated with the card device and communicating the first NFT to a distributed trust computing network. In response to the distributed trust computing network receiving the first NFT, the method includes (i) verifying the authenticity of the first NFT by a consensus of decentralized nodes of the distributed trust computing network reaching a consensus on the first NFT and (ii) generating a data block, within the distributed ledger, that stores the verified first NFT. The method further includes, in response to a user presenting the card device at a resource event apparatus, receiving, at the resource event apparatus, first NFT-related information from at least one of (i) the card device or (ii) a digital wallet of the user and determining whether the first NFT-related information matches the first NFT stored on the distributed ledger of the distributed trust computing network. In response to determining that the first NFT-related information matches the first NFT stored on the distributed ledger of the distributed trust computing network, the method includes authenticating the card device. In response to determining that the first NFT-related information does not match the first NFT stored on the distributed ledger of the distributed trust computing network, the method includes denying the user from conducting resource events at the resource event apparatus using the card device.

In specific embodiments of the computer-implemented method, generating the first NFT associated with the card device further includes generating the first NFT by using, as an input to a hash algorithm, at least one (i) an image of the card device (ii) computer-readable indicia displayed on a facing of the card device, and (iii) user information associated with the card device. Further, receiving first NFT-related information from the card device further includes at least one of (i) capturing an image of at least one facing of the card device, (ii) reading the computer-readable indicia displayed on the facing of the card, and (iii) reading the user information from an embedded chip or magnetic strip of the card device.

In other specific embodiments the computer-implemented further includes, in response to issuing the card device to the user, generating a second non-fungible token (NFT) that is (i) associated with identification of the user and (ii) linked to the first NFT and communicating the second NFT to the distributed trust computing network. In response to the distributed trust computing network receiving the second NFT, the computer-implemented method includes (i) verifying the authenticity of the second NFT by a consensus of decentralized nodes of the distributed trust computing network reaching a consensus on the second NFT and (ii) generating a data block, within the distributed ledger, that stores the verified second NFT. Further, the computer-implemented method includes receiving, at the resource event apparatus, second NFT-related information from the user. In addition, the computer-implemented method includes, in response determining that the first NFT-related information matches the first NFT stored on the distributed ledger of the distributed trust computing network, determining that (i) the second NFT-related information matches the second NFT and (ii) the second NFT is linked to the first NFT, and, in response to determining (i) and (ii), authorizing the user to conduct resource events at the resource event apparatus using the card device. In related embodiments of the computer-implemented method, generating the second NFT further includes generating the second NFT by using, as an input to a hash algorithm, at least one of (i) an image of the user and (ii) an image of user identification credential or information included within the user identification credential, and receiving the second NFT-related information from the user further includes at least one of (a) capturing an image of the user, and (b) capturing or receiving an image of the user identification credential.

In additional specific embodiments the computer-implemented method further includes communicating resource event-related information to the distributed trust computing network. The resource event-related information includes at least (a) the first NFT-related information and the second NFT-related information, (b) card device authentication approval/denial status, (c) user authentication approval/denial status, and (d) resource event approval/denial status. In response to the distributed trust computing network receiving the resource event-related information, the computer-implemented method includes (i) verifying the authenticity of the resource event-related information by a consensus of decentralized nodes of the distributed trust computing network reaching a consensus on the resource event-related information, and (ii) generating a data block, within the distributed ledger, that stores the verified resource event-related information and is linked to the first NFT.

A computer program product including a non-transitory computer-readable medium defines third embodiments of the invention. The non-transitory computer-readable medium includes a first set of codes for causing a computer to, in response to producing a card device configured for executing resource events, generate a first non-fungible token (NFT) associated with the card device a second set of codes for causing a computer to communicate the first NFT to a distributed trust computing network. The computer-readable medium additionally includes a third set of codes for causing a computer to, in response to the distributed trust computing network receiving the first NFT, (i) verify the authenticity of the first NFT by a consensus of decentralized nodes of the distributed trust computing network reaching a consensus on the first NFT, and (ii) generate a data block, within the distributed ledger, that stores the verified first NFT. The computer-readable medium additionally includes a fourth set of codes for causing a computer to, in response to a user presenting the card device at a resource event apparatus, receive, at the resource event apparatus, first NFT-related information from at least one of (i) the card device or (ii) a digital wallet of the user and a fifth set of codes for causing a computer to determine whether the first NFT-related information matches the first NFT stored on the distributed ledger of the distributed trust computing network. Moreover, the computer-readable includes a sixth set of codes for causing a computer to (a) in response to determining that the first NFT-related information matches the first NFT stored on the distributed ledger of the distributed trust computing network, authenticating the card device and, (b) in response to determining that the first NFT-related information does not match the first NFT stored on the distributed ledger of the distributed trust computing network, deny the user from conducting resource events at the resource event apparatus using the card device.

In specific embodiments of the computer program product, the first set of codes are further configured to cause the computer to generate the first NFT by using, as an input to a hash algorithm, at least one (i) an image of the card device (ii) computer-readable indicia displayed on a facing of the card device, and (iii) user information associated with the card device, and the fourth set of codes are further configured to cause the computer to receive the first NFT-related information from the card device by at least one of (i) capturing an image of at least one facing of the card device, (ii) reading the computer-readable indicia displayed on the facing of the card, and (iii) reading the user information from an embedded chip or magnetic strip of the card device.

In other embodiments of the computer program product, the computer-readable medium further includes a seventh set of codes for causing a computer to, in response to issuing the card device to the user, generate a second non-fungible token (NFT) that is associated with identification of the user and is linked to the first NFT and an eighth set of codes for causing a computer to communicate the second NFT to the distributed trust computing network. In addition, the computer-readable medium includes a ninth set of codes for causing a computer to, in response to the distributed trust computing network receiving the second NFT, (ii) verify the authenticity of the second NFT by a consensus of decentralized nodes of the distributed trust computing network reaching a consensus on the second NFT and (ii) generate a data block, within the distributed ledger, that stores the verified second NFT. Moreover, the computer-readable medium includes a tenth set of codes for causing a computer to receive, at the resource event apparatus, second NFT-related information from the user, an eleventh set of codes for causing a computer to, in response determining that the first NFT-related information matches the first NFT stored on the distributed ledger of the distributed trust computing network, determine that (i) the second NFT-related information matches the second NFT and (ii) the second NFT is linked to the first NFT, and a twelfth set of codes for causing a computer to, in response to determining (i) and (ii), authorize the user to conduct resource events at the resource event apparatus using the card device.

Moreover, in other specific embodiments of the computer program product, the computer-readable medium further includes a thirteenth set of codes for causing a computer to communicate resource event-related information to the distributed trust computing network. The resource event-related information includes at least (a) the first NFT-related information and the second NFT-related information, (b) card device authentication approval/denial status, (c) user authentication approval/denial status, and (d) resource event approval/denial status. In addition, the computer-readable medium includes a fourteenth set of codes for causing a computer to, in response to the distributed trust computing network receiving the resource event-related information, (i) verify the authenticity of the resource event-related information by a consensus of decentralized nodes of the distributed trust computing network reaching a consensus on the resource event-related information, and (ii) generate a data block, within the distributed ledger, that stores the verified resource event-related information and is linked to the first NFT.

Thus, according to embodiments of the invention, which will be discussed in greater detail below, the present invention addresses needs and/or achieves other advantages by for enhanced authentication of the card device and, in some embodiments of the invention, the user of the card device at resource event apparatuses. Specifically, the invention relies on generating card device-specific Non-Fungible Tokens (NFTs) and, in some embodiments of the invention user credential-specific NFTs. Since the NFTs are stored within a distributed ledger of a distributed trust computing network, the NFTs are verified, through consensus reached by nodes, as being authentic and unique. Once a resource event is initiated at a resource event apparatus, card device-related information and, in some embodiments, user credential-related information is received, and the information is compared to the corresponding NFT as a means of authenticating the card device and, in some embodiments, the card device and the linked user of the card device. As a result, the present invention prevents the use of imitation card devices and authenticates the identity of the user of the card device is ensures that the user is verifiably linked to the card device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
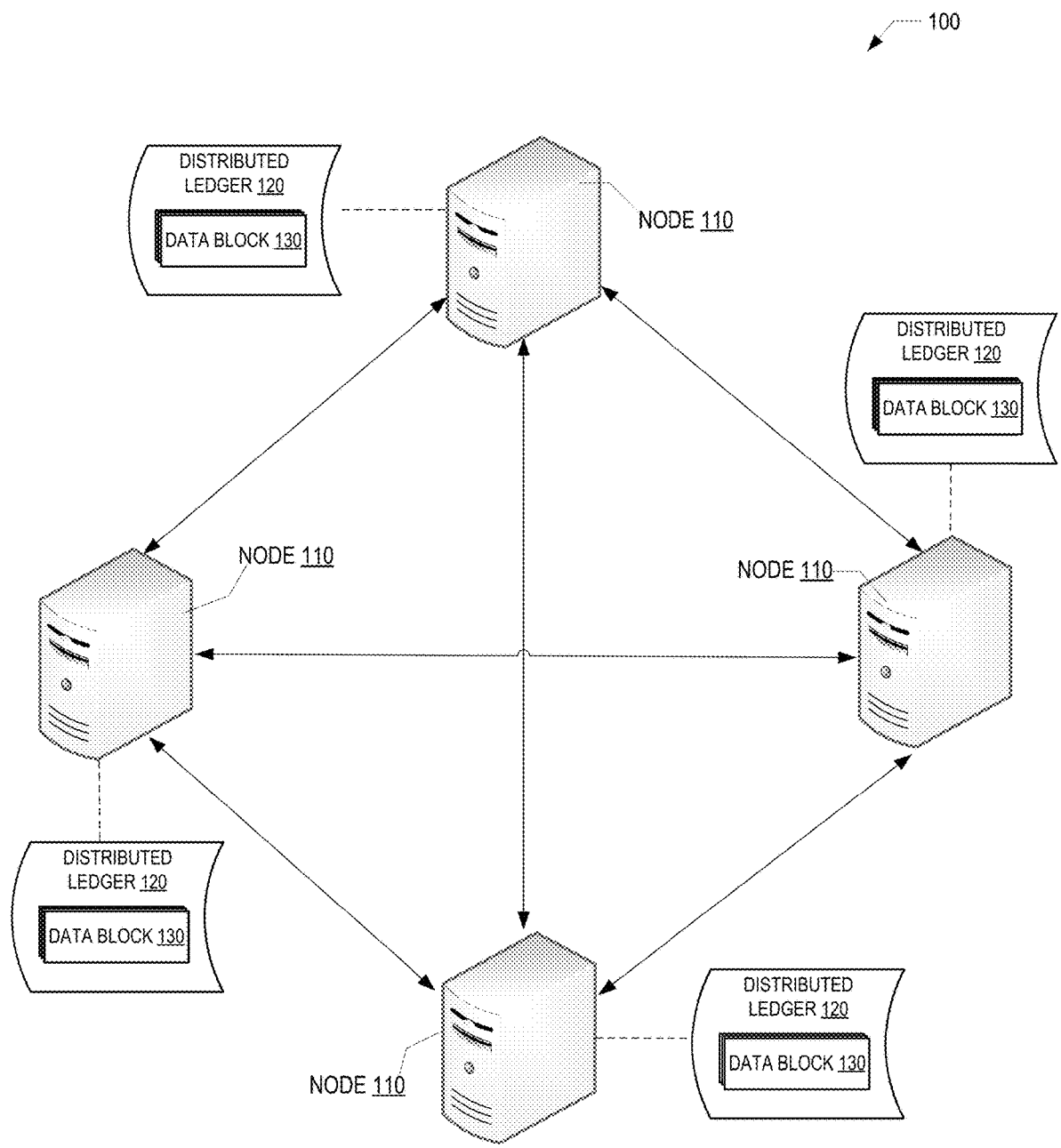
Figure 2:
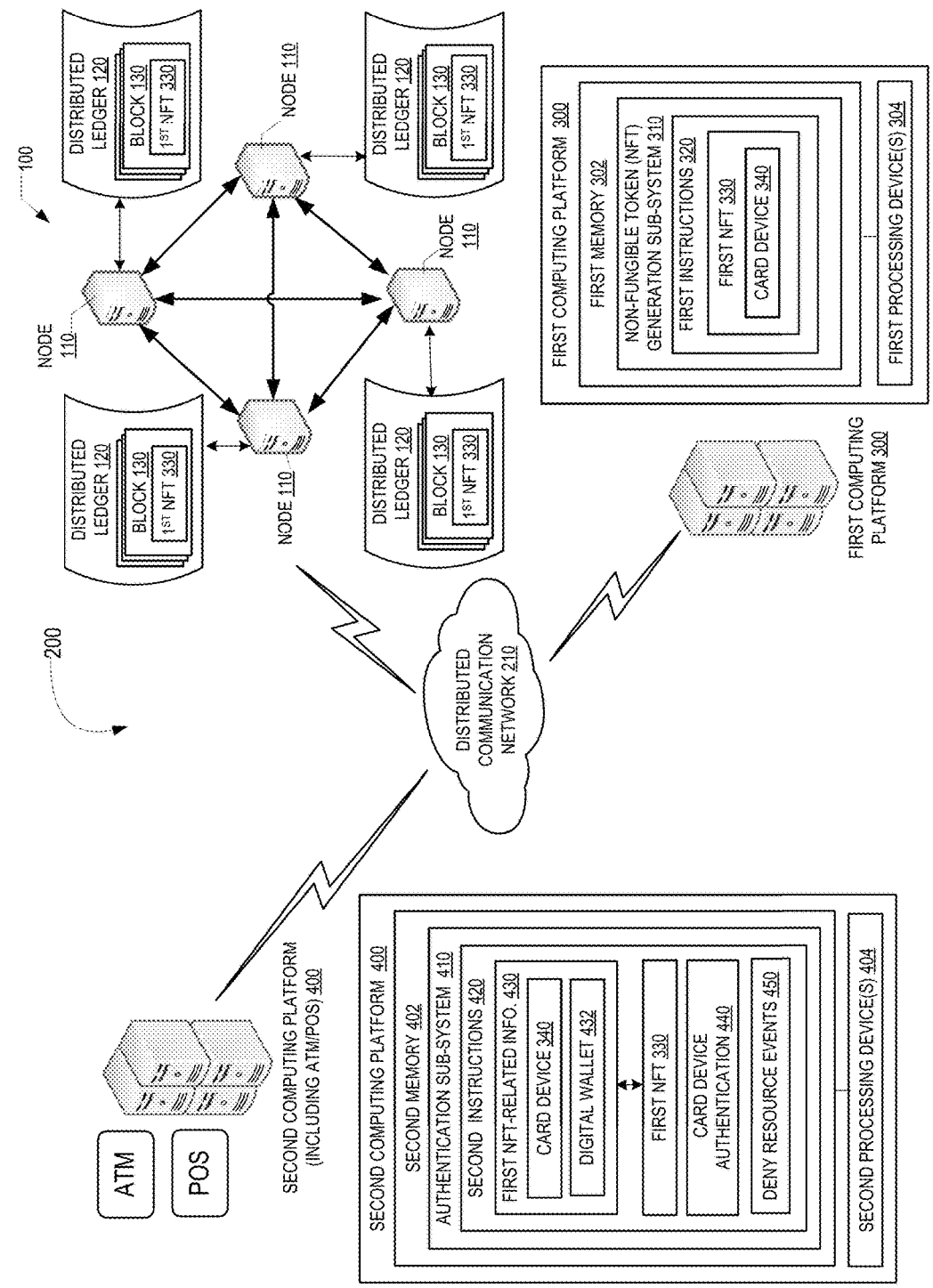
Figure 3:
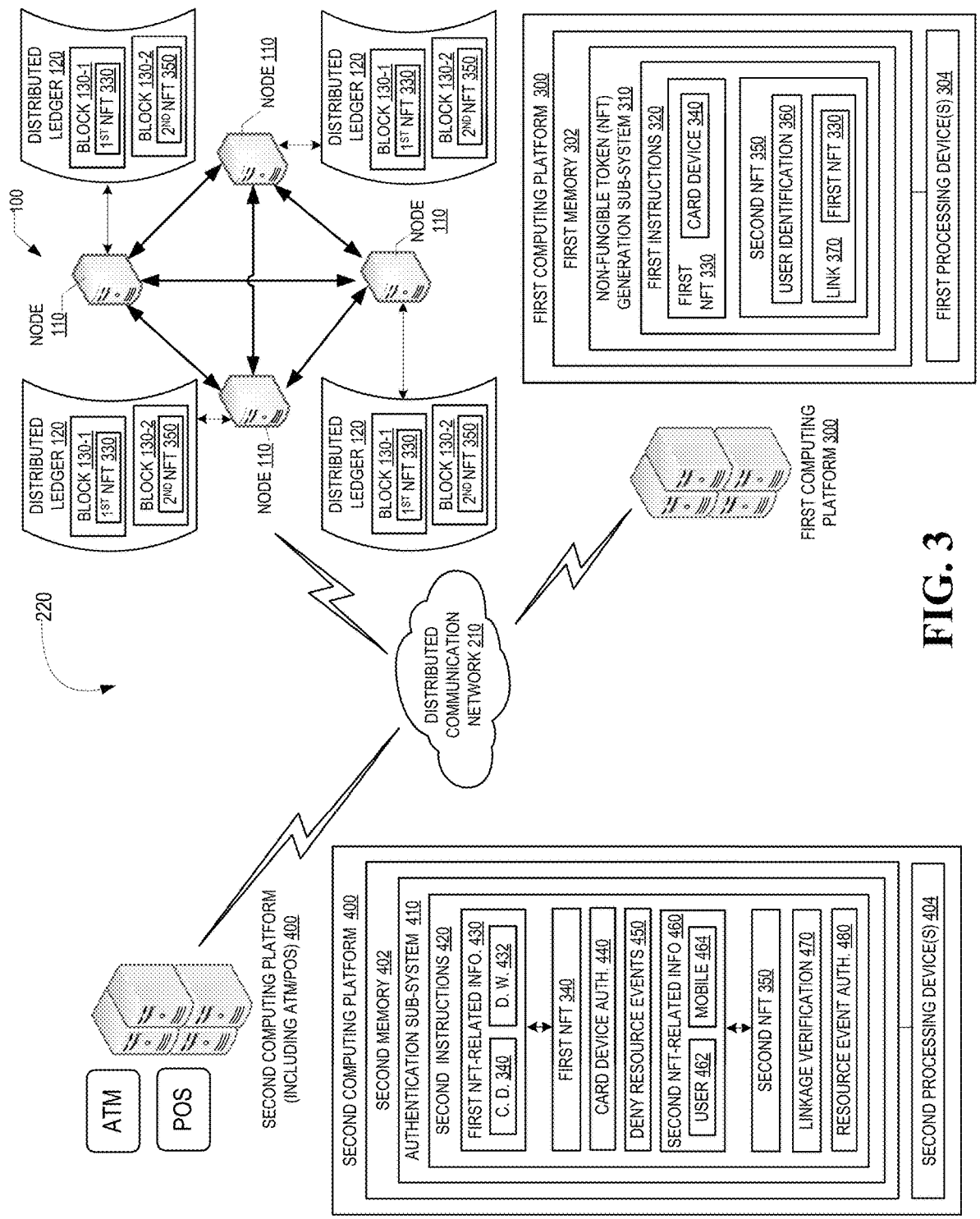
Figure 4:
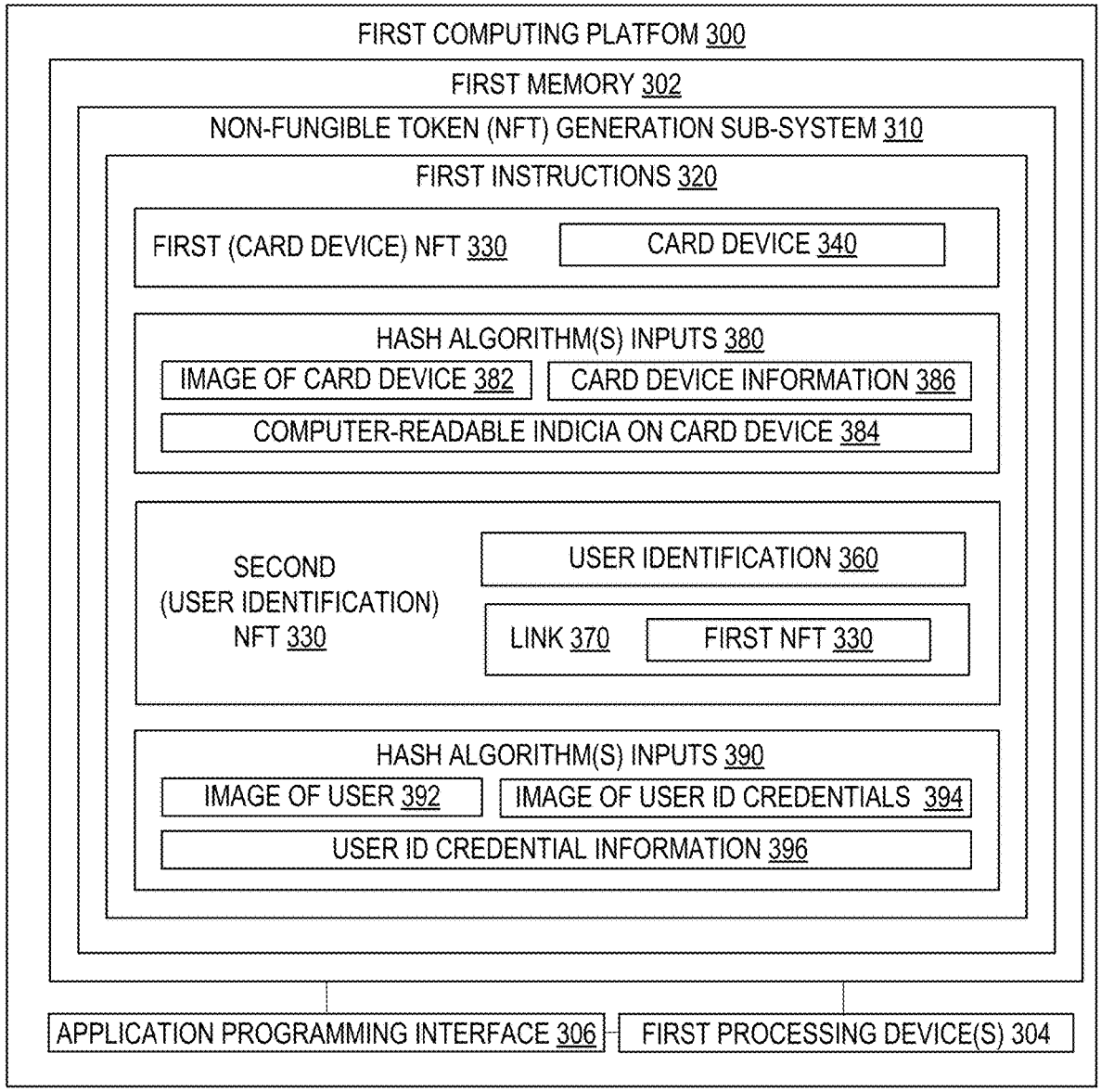
Figure 5:
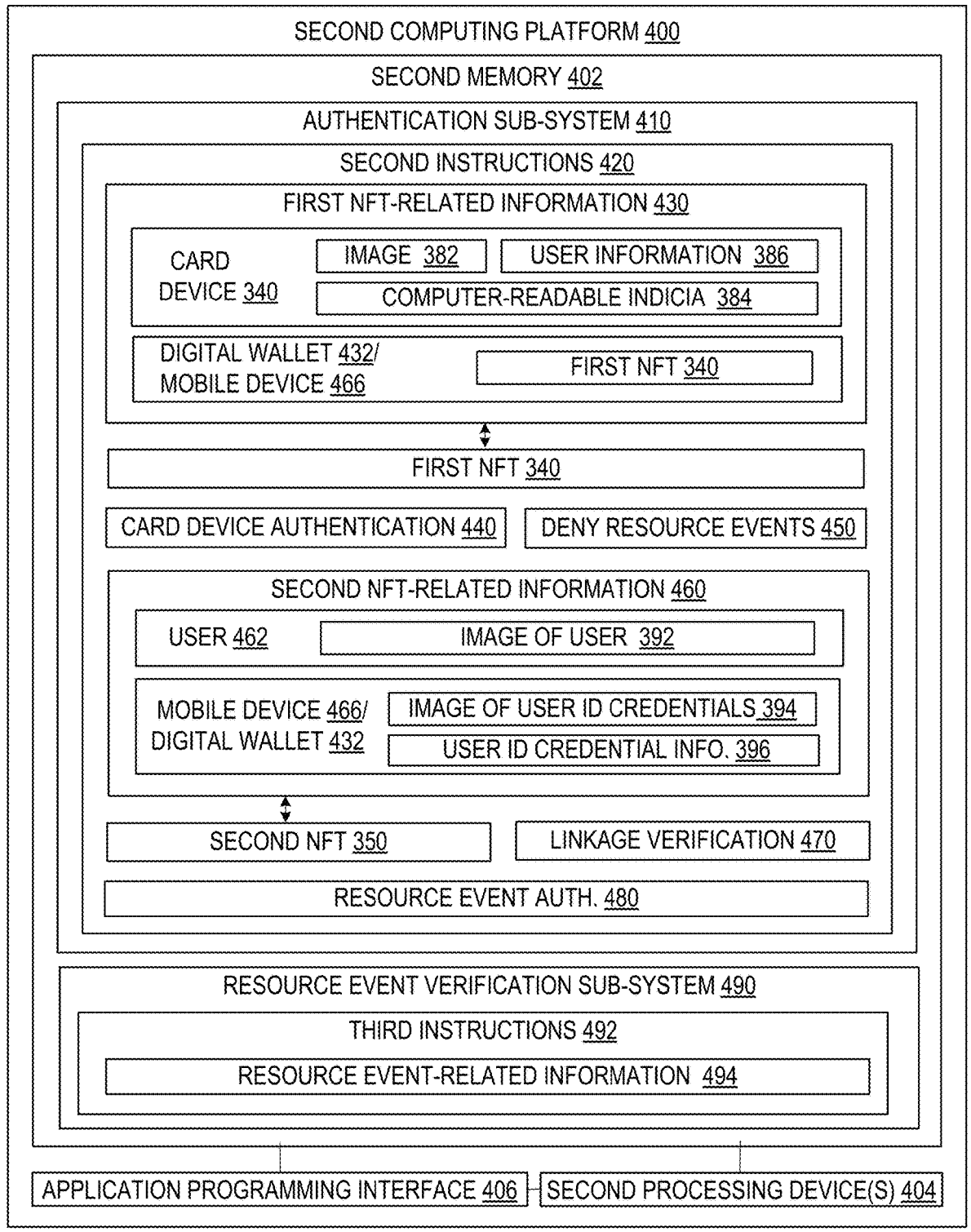
Figure 6:
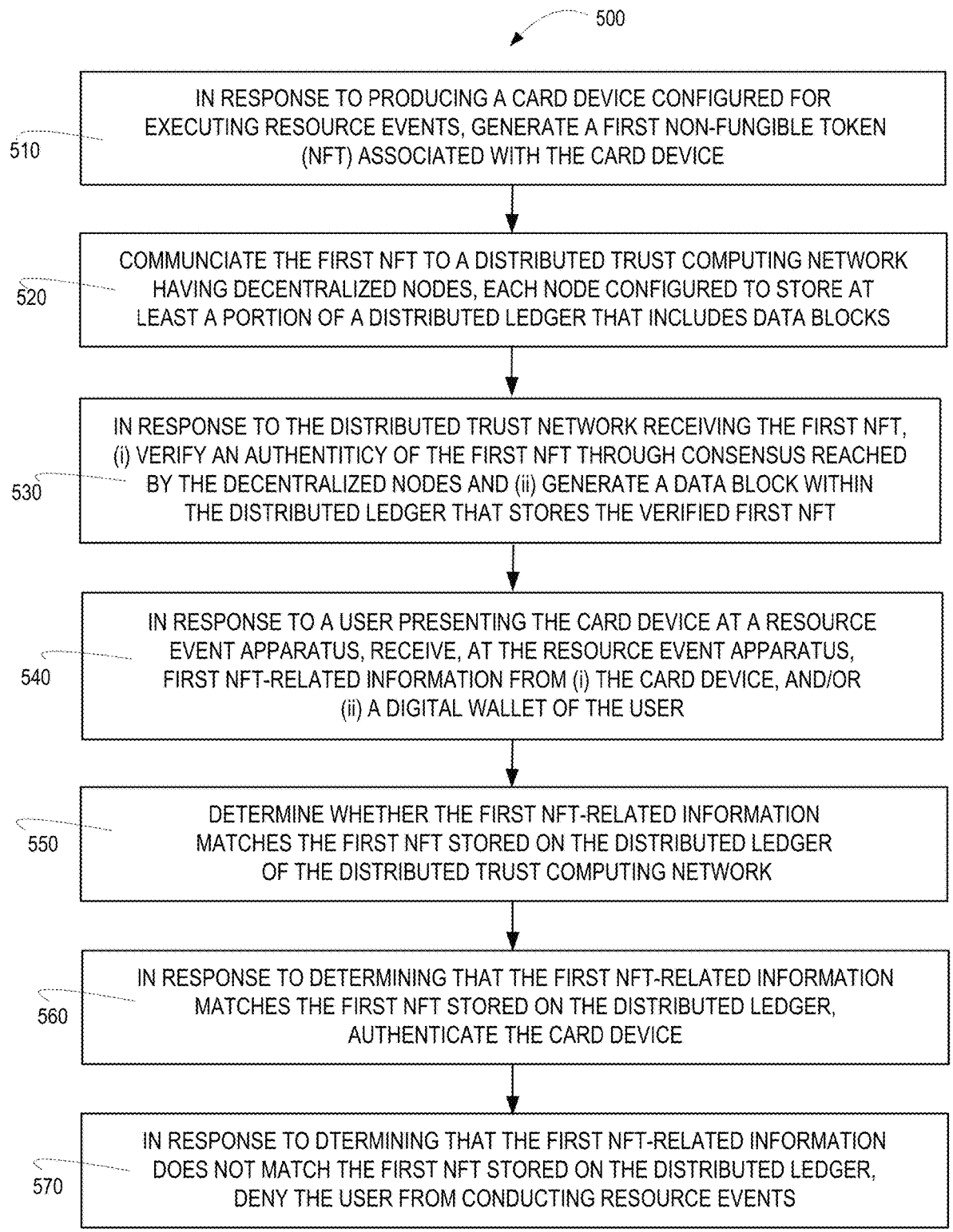
Figure 7:
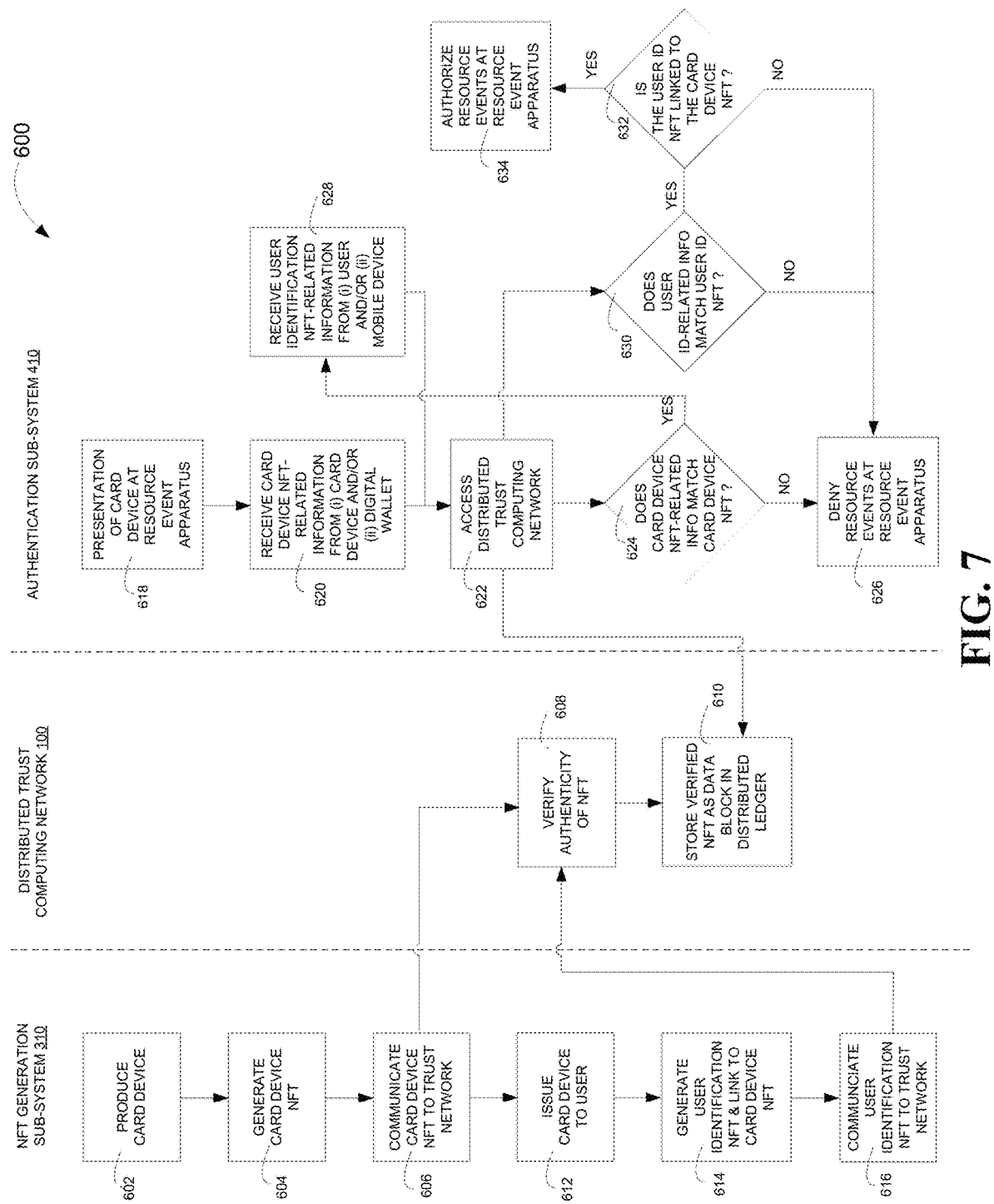

Having thus described embodiments of the disclosure in general terms, reference will now be made to the accompanying drawings, wherein:

FIG. 1 is a schematic/block of a distributed trust computing network, in accordance with embodiments of the present invention;

FIG. 2 is a schematic/block diagram of an enhanced system for authenticating card devices using non-fungible tokens (NFTs), in accordance with embodiments of the present invention;

FIG. 3 is a schematic/block diagram of an alternate enhanced system for authenticating card devices and users of card devices using NFTs, in accordance with embodiments of the present invention;

FIG. 4 is a block diagram of a computing platform including a NFT generation sub-system, in accordance with embodiments of the present invention;

FIG. 5 is a block diagram of a computing platform including an authentication sub-system and a resource event verification sub-system, in accordance with alternate embodiments of the invention;

FIG. 6 is a flow diagram of a method for enhanced authentication using NFTs, in accordance with embodiments of the present invention; and FIG. 7 is a flow diagram of a method for dual authentication of a card device and a user linked to the card device, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, generate mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provide for enhanced authentication, at a resource event apparatus (e.g., ATM, POS device or the like) of the card device and, in some embodiments of the invention, the user of the card device. Specifically, the invention relies on generating card device-specific Non-Fungible Tokens (NFTs) and, in some embodiments of the invention user credential-specific NFTs. Since the NFTs are stored within a distributed ledger of a distributed trust computing network, the NFTs are verified, through consensus reached by nodes, as being authentic and unique.

Card device-specific NFTs may be generated using, as the input to the hash algorithm(s), one or more of (i) an image of at least one facing of the card device, (ii) unique computer-readable indicia displayed on a portion of a facing of the card device, and/or (iii) card-related information (e.g., information accessible through inserting or swiping the card device at a resource event apparatus), such as user identifier, account identifier or the like. Subsequently, when the card is inserted into or swiped at a resource event apparatus, the card device-related information used to generate the card-device-specific NFT is received by performing at least one (i) capturing or receiving an image of the facing of card device, (ii) reading the unique computer indicia and/or (iii) reading or accessing the card-related information stored on an embedded chip or magnetic strip of the card device or a digital wallet of a mobile device in possession of the user. Once the card device-related information is received at the resource event apparatus, the distributed trust computing network is accessed to determine if a match exists between device-related information and the card device-specific NFT. If a match is determined to exist, the card device is deemed to be authenticated, while if no match is determined to exist, the user is denied from processing further events at the resource event apparatus.

In further embodiments of the invention, the authentication is a dual authentication of both the card device and the user of the card device. In such embodiments of the invention, once the card device is assigned to a user, a user credential-specific NFT is generated using, as the input to the hash algorithm(s), one or more of (i) an image of the user, (ii) an image of a facing of user credentials (e.g., a driver's license, passport or the like) and/or (iii) information displayed on the user credentials (e.g., name, address, driver's license number, passport number or the like). In addition, the user credential-specific NFT is linked to the card device-specific NFT (i.e., the data block within the distributed ledger that contains the user credential-specific NFT is linked to the data block within the distributed ledger that contains the card device-specific NFT). Subsequently, at the resource event apparatus, user-credential information is received by performing one or more of (i) capturing or receiving an image of the user, (ii) capturing or receiving an image of a facing of the user credentials and/or (iii) receiving user credential information. Once the card device has been authenticated (i.e., once a determination is made that the card-device information matches the card device-specific NFT), the distributed trust computing network is accessed to determine if a match exists between the user credential information and a user credential-specific NFT (i.e., whether a user credential-specific NFT exists for the user credential information) and, if so, whether the user credential-specific NFT is linked to the card-device-specific NFT. If a match and link is determined to exist, the user is deemed to be authenticated and allowed to process/conduct resource events and the resource event apparatus, while if no match or no link is determined to exist, the user is denied from processing further events at the resource event apparatus.

Referring to FIG. 1, a schematic diagram of an exemplary distributed trust computing network 100 is depicted, in accordance with embodiments of the present invention. The distributed trust computing network 100, in other instances referred to a blockchain network, is a distributed database that maintains, e.g., a list of data records, or the like. In specific embodiments of the invention the data records may include non-fungible tokens (NFTs) that serve to verify the authenticity card devices and users of card devices. The security of the data maintained within the trust network is enhanced by the distributed nature of the network. The distributed trust computing network 100 typically includes several decentralized nodes 110, which may be one or more systems, machines, computers, databases, data stores or the like operably connected with one another. In some instances, each of the nodes 110 or multiple nodes 110 are maintained by different entities. A distributed trust computing network 100 typically works without a central repository or single administrator.

A distributed trust computing network 100 provides numerous advantages over traditional storage networks/databases. A large number of the decentralized nodes 110 of a trust network may reach a consensus regarding the validity of resources or data maintained with a block of the distributed trust computing network, in the context of the present invention the validity of the hardware component and/or device (i.e., the validity of the measured authenticity characteristics).

The distributed trust computing network 100 typically has two primary types of records. The first type is the record type, which consists of the actual data, in this case an NFT, stored in a data block 130 within a distributed register/ledger 120. The second type is the block type, which are records that confirm when and in what sequence certain events became recorded as part of the distributed trust computing network. Records, such as a code change file segment records, and the events associated therewith are generated by participants using the distributed trust computing network in its normal course of business, for example, when code change file segment is determined, a data block(s) 130 is generated by users known as "miners" who use specialized software/equipment to generate data blocks 130. Holders of a data block 130 of the distributed trust computing network 100 agree to store the data block 130 within the distributed trust computing network 100 and the related data blocks 130 are passed around to various nodes 110 of the distributed trust computing network 100. A "valid" data block 130 or related event is one that can be validated based on a set of rules that are defined by the particular system implementing the distributed trust computing network 100. For example, in the case of card devices and users of card devices verification, a valid data block is one that stores an NFT which serves to verify the authenticity of the corresponding card device or user of the card device.

A distributed trust computing network 100 is decentralized—meaning that a distributed register/ledger 120 (i.e., a decentralized register/ledger) is maintained on multiple nodes 110 of the distributed trust computing network 100. In this regard, one node 110 in the distributed trust computing network 100 may have a complete or partial copy of the distributed register/ledger 120 or set of records and/or blocks 130 on the distributed trust computing network 100. Transactions/events (i.e., newly presented NFTs) are initiated at a node 110 of a distributed trust computing network 100 and communicated to the various other nodes 110 of the distributed trust computing network 100 for validation purposes. Any of the nodes 110 can validate the content of a data block 130 or an associated event, add the data block 130 and/or the contents of the data block 130 to its copy of the distributed register/ledger 120, and/or broadcast the detail/data of the data block 130, its associated validation (in the form of a data block 130) and/or other data to other nodes 130.

Referring to FIG. 2, a schematic/block diagram is presented of a system 200 for verifying the authenticity of a card device using Non-Fungible Tokens (NFTs), in accordance with embodiments of the present invention. The system 200 is implemented within a distributed communication network 210 that may include the Internet, one or more intranets, one or more cellular networks, one or more short-range wireless networks or the like.

The system includes a distributed trust computing network 100 including a plurality of decentralized nodes 110. Each decentralized node 110 having a memory (not shown in FIG. 2) and at least one processing device (not shown in FIG. 2). The memory of the decentralized nodes 110 is configured to store a distributed ledger 120 that includes a plurality of data blocks 130.

The system 100 additionally includes a first computing platform 300 having a first memory 302 and at least one first processing device 304 in communication with first memory 302. First memory 302 stores Non-Fungible Token (NFT) generation sub-system 310 that includes first instructions 320, which are executable by at least one of the first processing devices 304. First instructions 320 are configured to, in response to producing a card device 340, generate a first NFT 330 associated with the card device 340 (i.e., a card device NFT 330). The card device 340 may include any card device having a magnetic strip or embedded chip that stores information. For example, the card device 340 may be a debit card device or a credit card device that stores user account information or the magnetic strip or embedded chip and is used to conduct financial transactions. As discussed infra., in specific embodiments of the invention, the first NFT 330 may be generated using, as at least a portion of the input to one or more hash algorithms, one or more of (i) an image(s) of one or more facings of the card device, (ii) computer-readable indicia displayed on a portion of a facing of the card device and/or (iii) information stored on the magnetic strip or embedded chip of the chip device and/or the like.

Once the first NFT 330 has been generated, the first NFT 330 is communicated to the distributed trust computing network 100. In response to the distributed trust computing network 100 receiving the first NFT 330, the decentralized nodes 110 of the trust computing network 100 are configured to reach a consensus on the first NFT 330 to verify the authenticity of the NFT and generate a first data block 130 within the distributed ledger 120 that stores the verified first NFT 330.

System 200 additionally includes a second computing platform 400, which may include an Automated Teller Machine (ATM), Point-of-Sale (POS) device, as well as back-end/network apparatus, such as application servers or the like. Second computing platform 400 has a second memory 402 and at least one second processing device 404 in communication with second memory 402. Second memory 402 stores authentication sub-system 410 that includes second instructions 420, which are executable by at least one of the second processing devices 404. Second instructions 420 are configured to, in response to a user presenting the card device 340 at a resource event apparatus, receive first NFT-related information 430 from at least one of (i) the card device 340 and/or (ii) a digital wallet/mobile device of the user. In specific embodiments of the invention, presentation of the card device 340 at a resource event apparatus includes, inserting, swiping or making wireless contact with an Automated Teller Machine (ATM), Point-of-Sale (POS) device or the like. In other specific embodiments of the invention, receiving the first NFT-related information 430 may include at least one of (i) capturing or receiving an image of a facing of the card device 340, (ii) reading the computer-readable indicia displayed on a facing of the card device 340, and/or (iii) receiving short-range wireless communication of the first NFT 330 stored in a digital wallet on the user's mobile communication device.

In response to receiving first NFT-related information 430, second instructions 420 are further configured to determine whether the first NFT-related information 430 matches the first NFT 330. Such a determination may be made by accessing the distributed trust computing network 100 or, in other embodiments of the invention, the corpus of first NFTs may have been previously downloaded/communicated to the second computing platform 400, thus, obviating the need to access to the distributed trust computing network 100. In response to determining that the first NFT-related information 430 does match the first NFT 330, second instructions 420 are configured to deem the card device 340 to be authenticated 440 (i.e., the card device is not an imitation card device). In specific embodiments of the invention, such authentication may result in authorization for the user to conduct resource events at the resource event apparatus, while in other instances, as discussed infra., further authentication may be required (such as authentication of the user and/or verification that the user is linked to the card device). In response to determining that the first NFT-related information 430 does not match the first NFT 330, second instructions 420 are configured to deny 450 further processing of any resource events at the resource event apparatus. For example, in specific embodiments of the invention, a user may be denied from conducting transactions at the ATM, POS device or the like.

Referring to FIG. 3, a schematic/block diagram is presented of an alternate system 220 for verifying the authenticity of a card device and authenticating the user of the card device (i.e., dual authentication) using Non-Fungible Tokens (NFTs), in accordance with embodiments of the present invention. The system 220 includes the distributed trust computing network 100, first computing platform 300 and second computing platform 400 discussed in relation to FIG. 2. In the system 220, first instructions 320 of NFT generation sub-system 310 are further configured to, in response to issuing the card device 340 to a user, generate a second NFT 350 associated with user identification 360 (i.e., a user identification NFT) and linked 370 to the first NFT 330. As discussed infra., in specific embodiments of the invention, the second NFT 350 may be generated using, as at least a portion of the input to one or more hash algorithms, one or more of (i) an image(s) of the user, (ii) an image of user identification credential (e.g., driver's license, passport or the like) and/or (iii) information displayed on the user identification credential (e.g., name, address, driver's license number, passport number and the like) and/or the like. Linking of the second NFT to the first NFT ensures that the card device 340 is being used at the resource event apparatus by an individual that has been verified, by the distributed trust computing network, as an authorized user of the card device 340.

Further, in system 220, second instructions 420 of authentication sub-system 410 are configured to, receive second NFT-related information 460 from at least one of (i) the user and/or (ii) a digital wallet/mobile device of the user. In specific embodiments of the invention, receiving the second NFT-related information 460 may include at least one of (i) capturing or receiving an image of the user, (ii) capturing or receiving an image of the user identification credential, and/or (iii) receiving short-range wireless communication of the second NFT 330 stored in a digital wallet 432 on the user's mobile communication device 466 and/or user identification credential information 396. In response to determining that the first NFT-related information 430 matches the first NFT 340 (i.e., in response to authenticating the card device 340), second instructions 420 are further configured determine whether the second NFT-related information 460 matches the second NFT 350 and, if so, whether the second NFT 350 is linked to the first NFT 330 (i.e., linkage verification 470). In response to determining that the second NFT-related information 460 matches the second NFT 350 and the second NFT 350 is linked to the first NFT 330, second instructions 420 are configured to provide the user resource event authorization 480 to conduct resource events at the resource event apparatus. However, in response to determining either that the first NFT-related information 430 does not match the first NFT 340 or the second NFT 350 is not linked to the first NFT 330, second instructions 420 are further configured determine whether the second NFT-related information 460 matches the second NFT 350 and, if so, whether the second NFT 350 is linked to the first NFT 330 (i.e., linkage verification 470). In response to determining that the second NFT-related information 460 matches the second NFT 350 and the second NFT 350 is linked to the first NFT 330, second instructions 420 are configured to deny 450 the user from performing resource events at the resource event apparatus.

Referring to FIG. 4, a block diagram is presented of first computing platform 300 including NFT generation sub-system 310, in accordance with embodiments of the present invention. First computing platform 300 comprises one or more computing devices/apparatus, such as application servers or the like configured to execute software programs, including instructions, engines, algorithms, modules, routines, applications, tools, and the like. First computing platform 300 includes first memory 302, which may comprise volatile and non-volatile memory, EPROM, EEPROM, flash cards, or any memory common to computer platforms. Moreover, first memory 302 may comprise cloud storage, such as provided by a cloud storage service and/or a cloud connection service.

Further, first computing platform 300 also includes first processing device(s) 304, which may be an application-specific integrated circuit ("ASIC"), or other chipset, logic circuit, or other data processing device. First processing device 304 may execute an application programming interface ("API") 306 that interfaces with any resident programs, such as NFT generation sub-system 310 and algorithms, sub-engines/routines associated therewith or the like stored in the first memory 302 of first computing platform 300.

First processing device(s) 304 may include various processing subsystems (not shown in FIG. 4) embodied in hardware, firmware, software, and combinations thereof, that enable the functionality of first computing platform 300 and the operability of computing platform 300 on a distributed communication network 210. For example, processing subsystems allow for initiating and maintaining communications and exchanging data with other networked devices. For the disclosed aspects, processing subsystems of first processing device(s) 304 may include any subsystem used in conjunction with NFT generation sub-system 310 and related engines, routines, algorithms, sub-algorithms, modules, sub-modules thereof.

First computing platform 300 additionally includes a communications module (not shown in FIG. 4) embodied in hardware, firmware, software, and combinations thereof, that enables electronic communications between first computing platform 300 and other networks and/or networked devices, such as, distributed trust computing network 100 and the like. Thus, the communication module may include the requisite hardware, firmware, software and/or combinations thereof for establishing and maintaining a network communication connection with one or more systems, platforms, networks, or the like.

First memory 302 of first computing platform 300 stores NFT generation sub-system 310 that includes first instructions 320 which are configured to, in response to producing a card device, generate a first NFT 330 associated with a card device 340. The hash algorithm(s) inputs 380 used to generate the first NFT 330 may include, but are not limited to, one or more of (i) an image 382 of at least one facing of the card device 340, (ii) computer-readable indicia 384 displayed on the card device, (iii) card device information 386 stored on or accessible to the card device and the like.

In addition, first instructions 320 are configured to, in response to issuing the card device to a user, generate a second NFT 350 associated with user identification 360 and linked 370 to the first NFT 330. The has algorithm(s) inputs 390 used to generate the second NFT 350 may include, but are not limited to, one or more of (i) a user image 392, (ii) a user identification credential (e.g., driver's license, passport or the like) image 394 (iii) user identification credential information 396 displayed on the user identification credential and the like.

Referring to FIG. 5, a block diagram is presented of second computing platform 400 including authentication sub-system 410, in accordance with embodiments of the present invention. Second computing platform 400 comprises one or more computing devices/apparatus, such as, an ATM, a POS device, an application server or the like configured to execute software programs, including instructions, engines, algorithms, modules, routines, applications, tools, and the like. Second computing platform 400 includes second memory 402, which may comprise volatile and non-volatile memory, EPROM, EEPROM, flash cards, or any memory common to computer platforms. Moreover, second memory 402 may comprise cloud storage, such as provided by a cloud storage service and/or a cloud connection service.

Further, second computing platform 400 also includes second processing device(s) 404, which may be an application-specific integrated circuit ("ASIC"), or other chipset, logic circuit, or other data processing device. Second processing device 404 may execute an application programming interface ("API") 406 that interfaces with any resident programs, such as authentication sub-system 410, resource event verification sub-system 490 and algorithms, sub-engines/routines associated therewith or the like stored in the second memory 402 of second computing platform 400.

Second processing device(s) 404 may include various processing subsystems (not shown in FIG. 5) embodied in hardware, firmware, software, and combinations thereof, that enable the functionality of second computing platform 400 and the operability of second computing platform 400 on a distributed communication network 210. For example, processing subsystems allow for initiating and maintaining communications and exchanging data with other networked devices. For the disclosed aspects, processing subsystems of second processing device(s) 404 may include any subsystem used in conjunction with authentication sub-system 410, resource event verification sub-system 490 and related engines, routines, algorithms, sub-algorithms, modules, sub-modules thereof.

Second computing platform 400 additionally includes a communications module (not shown in FIG. 5) embodied in hardware, firmware, software, and combinations thereof, that enables electronic communications between second computing platform 400 and other networks and/or networked devices, such as, distributed trust computing network 100 and the like. Thus, the communication module may include the requisite hardware, firmware, software and/or combinations thereof for establishing and maintaining a network communication connection with one or more systems, platforms, networks, or the like.

Second memory 402 of second computing platform 400 stores authentication sub-system 410 that includes second instructions 420 which are configured to, in response to presenting the card device at a resource event apparatus, receive first NFC-related information at the resource event apparatus from one or more of (i) the card device 340 and/or (ii) the user's digital wallet 432/mobile device 466. As previously discussed, the card device NFT-related information 430 may be received by (i) capturing or receiving an image 382 of the card device 340, (ii) reading the computer-readable indicia 384 displayed on the card device 340, (iii) receiving, via wireless transmission (NFC or the like), card device information 386 and/or the first NFC 340 from the user's digital wallet 432/mobile device 466.

In response to receiving first NFT-related information 430, second instructions 420 are further configured to determine whether the first NFT-related information 430 matches the first NFT 330. Such a determination may be made by accessing the distributed trust computing network 100 or, in other embodiments of the invention, the corpus of first NFTs may have been previously downloaded/communicated to the second computing platform 400, thus, obviating the need to access to the distributed trust computing network 100. In response to determining that the first NFT-related information 430 does match the first NFT 330, second instructions 420 are configured to deem the card device 340 to be authenticated 440 (i.e., the card device is not an imitation card device). In specific embodiments of the invention, such authentication may result in authorization for the user to conduct resource events at the resource event apparatus, while in other instances, as discussed infra., further authentication may be required (such as authentication of the user and/or verification that the user is linked to the card device). In response to determining that the first NFT-related information 430 does not match the first NFT 330, second instructions 420 are configured to deny 450 further processing of any resource events at the resource event apparatus.

Further, second instructions 420 are configured to receive second NFT-related information 460 from at least one of (i) the user 462 and/or (ii) a digital wallet 432/mobile device 466 of the user. In specific embodiments of the invention, receiving the second NFT-related information 460 may include at least one of (i) capturing or receiving an image 392 of the user 462, (ii) capturing or receiving an image 394 of the user identification credential, and/or (iii) receiving short-rang wireless communication of the second NFT 330 stored in a digital wallet on the user's mobile communication device. In response to determining that the first NFT-related information 430 matches the first NFT 340 (i.e., in response to authenticating the card device 340), second instructions 420 are further configured determine whether the second NFT-related information 460 matches the second NFT 350 and, if so, whether the second NFT 350 is linked to the first NFT 330 (i.e., linkage verification 470). In response to determining that the second NFT-related information 460 matches the second NFT 350 and the second NFT 350 is linked to the first NFT 330, second instructions 420 are configured to provide the user resource event authorization 480 to conduct resource events at the resource event apparatus. However, in response to determining either that the first NFT-related information 430 does not match the first NFT 340 or the second NFT 350 is not linked to the first NFT 330, second instructions 420 are further configured determine whether the second NFT-related information 460 matches the second NFT 350 and, if so, whether the second NFT 350 is linked to the first NFT 330 (i.e., linkage verification 470). In response to determining that the second NFT-related information 460 matches the second NFT 350 and the second NFT 350 is linked to the first NFT 330, second instructions 420 are configured to deny 450 the user from performing resource events at the resource event apparatus. In other words, according to described embodiments of the invention, both the card device and the user are required to be authenticated and the card device is required to be verifiably linked to the user in order for the user to proceed with resource events at the resource event apparatus.

Further, second memory 402 of second computing platform 400 stores resource event verification sub-system 490 which includes third instructions 492 that are executable by at least one of the second processor(s) 404. Third instructions 494 are configured to receive resource event-related information 494 and communicate the resource event-related information 494 to the distributed trust computing network. The resource event-related information 494 may include, but is not limited to, (i) the first NFT-related information 430, (ii) card device authentication approval/denial status, (iii) resource event approval/denial status, (iv) the second NFT-related information 460, (v) user authentication approval/denial status, (vi) other details related to a resource event and the like.

In response to the distributed trust computing network receiving the resource event-related information 494, the decentralized nodes 110 of the trust computing network 100 are configured to reach a consensus on the resource event-related information 494 to verify the authenticity of the resource event-related information 494 and generate a data block 130 within the distributed ledger 120 that stores the verified resource event-related information 494 and links the data block (i.e., resource event-related information 4940 to the data block(s) containing the first NFC and, in some embodiments, the second NFC.

Referring to FIG. 6, a flow diagram is depicted of a computer-implemented method 500 for authenticating a card device at a resource event apparatus using Non-Fungible Tokens (NFTs), in accordance with embodiments of the present invention. At Event 510, in response to manufacturing each of a plurality of components for a hardware device and measuring authenticity characteristics for each of the plurality of components, a component-based NFT is generated that uses, as the input to the hash algorithm, at least one component identifier and the measured authenticity characteristics of the corresponding component. As previously discussed, the authenticity characteristics include any characteristic of the hardware component that is measurable and is associated with component integrity (i.e., ensuring that the component is in a certifiable-state and has not otherwise been altered/tampered). In specific embodiments of the invention, the measurements may include, but are not limited to, electro-magnetic characteristics, heat attributes/characteristics, physical characteristics, such weight, dimensions and the like. To ensure the integrity of the component the authenticity characteristics should be measured as soon as possible after the component has manufactured and conducted in a controlled environment.

In response to generating the component-based NFTs, at Event 520, the component-based NFTs are communicated to a distributed trust computing network. The distributed trust computing network comprises a plurality of decentralized having a memory and one or more processing devices in communication with the memory. The memory of the decentralized nodes stores one or more distributed ledgers, which comprise a plurality of data blocks.

In response to the distributed trust network receiving the component-based NFTs, at Event 530, the authenticity and certifiable state of the NFTs, and, thus, the component is verified by the decentralized nodes of the distributed trust computing network reaching a consensus on the NFT. In response to verifying the authenticity and certifiable state of the NFTs, at Event 540, data blocks are generated within the distributed ledger of the distributed trust computing network that store a corresponding one of the verified NFTs. In this regard, the distributed ledger provides hardware integrity verification and traceability (i.e., chain-of-custody) when the components are subsequently assembled into sub-assemblies or end products (i.e., hardware devices). As previously discussed, the computer-implemented method may further include events for generating NFTs for subsequent sub-assemblies and/or the hardware device that includes the components. In such embodiments of the method, the generation of NFTs may use, as inputs to the hash algorithm(s), at least one identifier of the sub-assembly or hardware device and measured authenticity characteristics of the sub-assemblies and/or hardware device/end product.

Referring to FIG. 6, a flow diagram is depicted of a computer-implemented method 500 for authenticating a card device at a resource event apparatus using Non-Fungible Tokens (NFTs), in accordance with embodiments of the present invention. At Event 510, in response to producing a card device configured for executing resource events, a first Non-Fungible Token (NFT) is generated that is associated with the card device. Is previously discussed, the first NFT may be generated using, as at least a portion of the input to one or more hash algorithms, one or more (i) an image of a facing of the card device, (ii) computer-readable indicia displayed on a facing the card device, and/or (iii) information stored on the card device or the like. At Event 520, the first NFT is communicated to a distributed trust computing network that has decentralized nodes, which are configured to store at least a portion of a distributed ledger that comprises data blocks.

At Event 530, in response to the distributed trust computing network receiving the first NFT, the authenticity of the first NFT is verified through a consensus reached by the decentralized nodes and a data block is generated within the distributed ledger that stores the verified first NFT.

At Event 540, in response to a user presenting the card device at a resource event apparatus (e.g., ATM, POS device or the like), first NFT-related information is received at the resource event apparatus from (i) the card device and/or (ii) a digital wallet/mobile device of the user. As previously discussed, presenting the card device at the resource event apparatus may include inserting, swiping or short-range wirelessly contacting (e.g., NFC or the like) the card device at the resource event apparatus. Receiving the first NFC-related information may include at least one of (i) capturing or receiving an image of the card device, (ii) reading the computer-readable indicia, (iii) receiving data stored on the card device or the first NFC from a digital wallet or the mobile device or the like.

At Event 550, a determination is made as to whether the first NFC-related information matches a first NFT stored either on the distributed ledger of the distributed trust computing network or stored locally at the resource event apparatus (e.g., ATM, POS device or the like). In response to determining that the first NFC-related information matches a first NFT, at Event 560, the card device is deemed to be authenticated. Alternatively, in response to determining that the first NFC-related information does not match a first NFT, at Event 570, the user is denied/prohibited from conducting any resource events at the resource event apparatus.

Referring to FIG. 7, a flow diagram is presented of a method 600 for authenticating a card device and a used of the card device using NFTs, in accordance with embodiments of the present invention. At Event 602, a card device is produced/manufactured that is configured for performing resource events (e.g., transactions) at resource event apparatus (e.g., ATM, Pos device or the like). In response to producing/manufacturing the card device, at Event 604, a card device NFT is generated. The card device NFT is generated using, as at least a portion of the input to one or more hash algorithms, one or more of (i) an image of one or more facings of the card device, (ii) computer-readable indicia displayed on a facing of the card device, and/or (iii) information stored on the card device and/or the like. At Event 606, the card device NFT is communicated to a distributed trust computing network.

In response to the distributed trust computing network receiving the card device NFT, at Event 608, an authenticity of the card device NFT is verified by consensus being reached amongst a plurality of decentralized nodes that make up the distributed trust computing network and, at Event 610, the verified card device NFT is stored as a data block within a distributed ledger of the distributed trust computing network.

At Event 612, the card device is issued to a user and, in response at Event 614, a user identification NFT is generated and linked to the card device NFT. The user identification NFT is generated using, as at least a portion of the input to one or more hash algorithms, one or more of (i) an image of the user, (ii) an image of user identification credentials (e.g., driver's license, passport or the like) and/or (iii) information displayed on the user identification credentials and/or the like. At Event 616, the user identification NFT is communicated to a distributed trust computing network.

In response to the distributed trust computing network receiving the use identification NFT, at Event 608, an authenticity of the user identification NFT is verified by consensus being reached amongst a plurality of decentralized nodes that make up the distributed trust computing network and, at Event 610, the verified user identification NFT is stored as a data block within a distributed ledger of the distributed trust computing network.

At Event 618, the card device is presented at a resource event apparatus (e.g., ATM, POS device or the like) and, in response, at Event 620, card device NFT-related information is received at the resource event apparatus from one or more of (i) the card device and/or (ii) the user's digital wallet/mobile device. As previously discussed, the card device NFT-related information may be received by (i) capturing or receiving an image of the card device, (ii) reading the computer-readable indicia displayed on the card device, (iii) receiving, via wireless transmission (NFC or the like), card device information and/or the card device NFC from the user's digital wallet/mobile device. At Event 622, the distributed trust computing network is accessed and, at Decision 624, a determination is made as to whether the card device NFT-related information matches the card device NFC. If the determination is made that the card device NFT-related information does not match any of the card device NFCs stored on the distributed ledger of the distributed trust computing network, at Event 626, the user is denied from performing resource events at the resource event apparatus.

If the determination is made that the card device NFT-related information does not matches any of the card device NFCs stored on the distributed ledger of the distributed trust computing network, at Event 628, user identification NFT-related information is received at the resource event apparatus from one or more of (i) the user and/or (ii) the user's digital wallet/mobile device. It should be noted that the user identification NFT-related information may be received prior to the determination that the card device NFT-related information does not matches any of the card device NFCs. At Event 622, the distributed trust computing network is accessed and, at Decision 630, a determination is made as to whether the user identification NFT-related information matches any of the user identification NFC. If the determination is made that the user identification NFT-related information does not match any of the user identification NFCs stored on the distributed ledger of the distributed trust computing network, at Event 626, the user is denied from performing resource events at the resource event apparatus.

If the determination is made that the user identification NFT-related information does match a user identification NFC stored on the distributed ledger of the distributed trust computing network, at Decision 632, a determination is made as to whether the matched user identification NFC is linked to the card device NFC. If the user identification NFC is determined not to be linked to the card device NFC, at Event 626, the user is denied from performing resource events at the resource event apparatus. If the user identification NFC is determined to be linked to the card device NFC, at Event 634, the user is authorized to perform resource events at the resource event apparatus.

Thus, as described in detail above, present embodiments of the invention include systems, methods, computer program products and/or the like for enhanced authentication of the card device and, in some embodiments of the invention, the user of the card device at resource event apparatuses. Specifically, the invention relies on generating card device-specific Non-Fungible Tokens (NFTs) and, in some embodiments of the invention user credential-specific NFTs. Since the NFTs are stored within a distributed ledger of a distributed trust computing network, the NFTs are verified, through consensus reached by nodes, as being authentic and unique. Once a resource event is initiated at a resource event apparatus, card device-related information and, in some embodiments, user credential-related information is received, and the information is compared to the corresponding NFT as a means of authenticating the card device and, in some embodiments, the card device and the linked user of the card device. As a result, the present invention prevents the use of imitation card devices and authenticates the identity of the user of the card device is ensures that the user is verifiably linked to the card device.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for enhanced authentication at a resource event apparatus, the system comprising;
    a distributed trust computing network comprising a plurality of decentralized nodes, each decentralized node configured to store at least a portion of a distributed ledger comprising a plurality of data blocks;
    a first computing platform including a first memory and at least one first processing device in communication with the first memory, wherein the first memory stores a non-fungible token generation sub-system that includes first instructions that are executable by the at least one first processing device and are configured to:
        in response to producing a card device configured for executing resource events, use a hash algorithm to generate a first non-fungible token (NFT) associated with the card device, wherein at least a portion of an input to the hash algorithm is a first image of a facing of the card device, and
        communicate the first NFT to the distributed trust computing network,
    wherein in response to the distributed trust computing network receiving the first NFT, the decentralized nodes of the distributed trust computing network are configured to (i) reach a consensus on the first NFT to verify an authenticity of the first NFT, and (ii) generate a data block, within the distributed ledger, that stores the verified first NFT;
    a second computing platform including a second memory and at least one second processing device in communication with the second memory and an image-capturing mechanism in communication with the second processing device, wherein the second memory stores an authentication sub-system that includes second instructions that are executable by the at least one second processing device and are configured to:
        in response to a user presenting the card device at a resource event apparatus, receive first NFT-related information from at least one of (i) the card device or (ii) a digital wallet of the user, wherein receiving the first NFT-related information includes implementing the image-capturing mechanism to capture a second image of the facing of the card device, wherein the first NFT-related information comprises the second image of the facing of the card,
        determine whether the first NFT-related information matches the first NFT stored on the distributed ledger of the distributed trust computing network,
        in response to determining that the first NFT-related information matches the first NFT stored on the distributed ledger of the distributed trust computing network, authenticate the card device, and
        in response to determining that the first NFT-related information does not match the first NFT stored on the distributed ledger of the distributed trust computing network, deny the user from conducting resource events at the resource event apparatus using the card device.

2. The system of claim 1, wherein the first instructions configured to use the hash algorithm to generate the first NFT associated with the card device are further configured to use the hash algorithm to generate the first NFT, wherein at least a further portion of the input to the hash algorithm is computer-readable indicia displayed on a facing of the card device, and
    wherein the second instructions configured to receive first NFT-related information from the card device are further configured to read the computer-readable indicia displayed on the facing of the card, wherein the first NFT-related information further comprises the computer-readable indicia.

3. The system of claim 1, wherein the first instructions configured to use the has algorithm to generate the first NFT associated with the card device are further configured to use the has algorithm to generate the first NFT, wherein at least a further portion of the input to the hash algorithm is user information associated with the card device, and
    wherein the second instructions configured to receive first NFT-related information from the card device are further configured to read the user information from an embedded chip or magnetic strip of the card device, wherein the first NFT-related information further comprises the user information stored on the embedded chip or magnetic strip.

4. The system of claim 1, wherein the second instructions configured to receive first NFT-related information from the digital wallet are further configured to receive the first NFT-related information via wireless communication between a mobile device including the digital wallet and the resource event apparatus.

5. The system of claim 1, wherein the first instructions are further configured to:
    in response to issuing the card device to the user, generate a second non-fungible token (NFT) that is (i) associated with identification of the user and (ii) linked to the first NFT,
    communicate the second NFT to the distributed trust computing network, wherein in response to the distributed trust computing network receiving the second NFT, the decentralized nodes of the distributed trust computing network are configured to (i) reach a consensus on the second NFT to verify an authenticity of the second NFT, and (ii) generate a data block, within the distributed ledger, that stores the second NFT.

6. The system of claim 5, wherein the second instructions are further configured to:
receive second NFT-related information from the user,
in response to determining that the first NFT-related information matches the first NFT stored on the distributed ledger of the distributed trust computing network, determine that (i) the second NFT-related information matches the second NFT and (ii) the second NFT is linked to the first NFT,
in response to determining (i) and (ii), authorize the user to conduct resource events at the resource event apparatus using the card device.

7. The system of claim 6, wherein the first instructions configured to generate the second NFT are further configured to generate the second NFT by using an image of the user as an input to the hash algorithm, and
wherein the second instructions configured to receive second NFT-related information from the user are further configured to capture an image of the user, wherein the image of the user is the second NFT-related information.

8. The system of claim 6, wherein the first instructions configured to generate the second NFT are further configured to generate the second NFT by using at least one of an image of user identification credential or information included within the user identification credential as an input to the hash algorithm, and
wherein the second instructions configured to receive second NFT-related information from the user are further configured to capture or receive an image of the user identification credential, wherein the image of the user identification credential is the second NFT-related information.

9. The system of claim 1, wherein the second memory stores a resource event verification sub-system that includes third instructions that are executable by the at least one second processing device and are configured to:
communicate resource event-related information to the distributed trust computing network, wherein the resource event-related information includes at least (a) the first NFT-related information, (b) card device authentication approval/denial status, and (c) resource event approval/denial status,
wherein in response to the distributed trust computing network receiving the resource event-related information, the decentralized nodes of the distributed trust computing network are configured to (i) reach a consensus on the resource event-related information to verify an authenticity of the resource event-related information, and (ii) generate a data block, within the distributed ledger, that stores the verified resource event-related information and is linked to the first NFT.

10. The system of claim 6, wherein the third instructions are further configured to:
communicate resource event-related information to the distributed trust computing network, wherein the resource event-related information includes at least (a) the first NFT-related information and the second NFT-related information, (b) card device authentication approval/denial status, (c) user authentication approval/denial status, and (d) resource event approval/denial status,
wherein in response to the distributed trust computing network receiving the resource event-related information, the decentralized nodes of the distributed trust computing network are configured to (i) reach a consensus on the resource event-related information to verify an authenticity of the resource event-related information, and (ii) generate a data block, within the distributed ledger, that stores the verified resource event-related information and is linked to the first NFT.

11. A computer-implemented method for enhanced authentication at a resource event apparatus, the computer-implemented method is executed by one or more processing devices and comprising;
in response to producing a card device configured for executing resource events, using a hash algorithm to generate a first non-fungible token (NFT) associated with the card device, wherein at least a portion of an input to the hash algorithm is a first image of a facing of the card device;
communicating the first NFT to a distributed trust computing network;
in response to the distributed trust computing network receiving the first NFT, (i) verifying the authenticity of the first NFT by a consensus of decentralized nodes of the distributed trust computing network reaching a consensus on the first NFT and (ii) generating a data block, within the distributed ledger, that stores the verified first NFT;
in response to a user presenting the card device at a resource event apparatus, receiving, at the resource event apparatus, first NFT-related information from at least one of (i) the card device or (ii) a digital wallet of the user, wherein receiving the first NFT-related information includes implementing an image-capturing mechanism at the resource event apparatus to capture a second image the facing of the card device, wherein the first NFT-related information comprises the second image of the facing of the card;
determining whether the first NFT-related information matches the first NFT stored on the distributed ledger of the distributed trust computing network;
in response to determining that the first NFT-related information matches the first NFT stored on the distributed ledger of the distributed trust computing network, authenticating the card device; and
in response to determining that the first NFT-related information does not match the first NFT stored on the distributed ledger of the distributed trust computing network, denying the user from conducting resource events at the resource event apparatus using the card device.

12. The computer-implemented method of claim 11, wherein using the hash algorithm to generate the first NFT associated with the card device further comprises using the hash algorithm to generate the first NFT, wherein at least a further portion of the input to the hash algorithm is at least one (i) computer-readable indicia displayed on a facing of the card device, and (ii) user information associated with the card device, and
wherein receiving the first NFT-related information from the card device further comprises at least one of (i) reading the computer-readable indicia displayed on the facing of the card, and (ii) reading the user information from an embedded chip or magnetic strip of the card device.

13. The computer-implemented method of claim 12, further comprising:
in response to issuing the card device to the user, generating a second non-fungible token (NFT) that is (i) associated with identification of the user and (ii) linked to the first NFT;
communicating the second NFT to the distributed trust computing network;
in response to the distributed trust computing network receiving the second NFT, (i) verifying the authenticity of the second NFT by a consensus of decentralized nodes of the distributed trust computing network reaching a consensus on the second NFT and (ii) generating a data block, within the distributed ledger, that stores the verified second NFT;
receiving, at the resource event apparatus, second NFT-related information from the user;
in response to determining that the first NFT-related information matches the first NFT stored on the distributed ledger of the distributed trust computing network, determining that (i) the second NFT-related information matches the second NFT and (ii) the second NFT is linked to the first NFT; and
in response to determining (i) and (ii), authorizing the user to conduct resource events at the resource event apparatus using the card device.

14. The computer-implemented method of claim 13, wherein generating the second NFT further comprises generating the second NFT by using, as an input to a hash algorithm, at least one of (i) an image of the user and (ii) an image of user identification credential or information included within the user identification credential, and
wherein receiving the second NFT-related information from the user further comprises at least one of (a) capturing an image of the user, and (b) capturing or receiving an image of the user identification credential.

15. The computer-implemented method of claim 13, further comprising:
communicating resource event-related information to the distributed trust computing network, wherein the resource event-related information includes at least (a) the first NFT-related information and the second NFT-related information, (b) card device authentication approval/denial status, (c) user authentication approval/denial status, and (d) resource event approval/denial status;
in response to the distributed trust computing network receiving the resource event-related information, (i) verifying the authenticity of the resource event-related information by a consensus of decentralized nodes of the distributed trust computing network reaching a consensus on the resource event-related information, and (ii) generating a data block, within the distributed ledger, that stores the verified resource event-related information and is linked to the first NFT.

16. A computer program product including a non-transitory computer-readable medium, the non-transitory computer-readable medium comprising:
a first set of codes for causing a computer to, in response to producing a card device configured for executing resource events, use a hash algorithm to generate a first non-fungible token (NFT) associated with the card device, wherein at least a portion of an input to the hash algorithm is a first image of a facing of the card device;
a second set of codes for causing a computer to communicate the first NFT to a distributed trust computing network;
a third set of codes for causing a computer to, in response to the distributed trust computing network receiving the first NFT, (i) verify the authenticity of the first NFT by a consensus of decentralized nodes of the distributed trust computing network reaching a consensus on the first NFT and (ii) generate a data block, within the distributed ledger, that stores the verified first NFT;
a fourth set of codes for causing a computer to, in response to a user presenting the card device at a resource event apparatus, receive, at the resource event apparatus, first NFT-related information from at least one of (i) the card device or (ii) a digital wallet of the user, wherein receiving the first NFT-related information includes implementing an image-capturing mechanism at the resource event apparatus to capture a second image the facing of the card device, wherein the first NFT-related information comprises the second image of the facing of the card;
a fifth set of codes for causing a computer to determine whether the first NFT-related information matches the first NFT stored on the distributed ledger of the distributed trust computing network; and
a sixth set of codes for causing a computer to (a) in response to determining that the first NFT-related information matches the first NFT stored on the distributed ledger of the distributed trust computing network, authenticating the card device and, (b) in response to determining that the first NFT-related information does not match the first NFT stored on the distributed ledger of the distributed trust computing network, deny the user from conducting resource events at the resource event apparatus using the card device.

17. The computer program product of claim 16, wherein the first set of codes are further configured to cause the computer to use the hash algorithm to generate the first NFT, wherein at least a further portion of the input to the hash algorithm is at least one (i) computer-readable indicia displayed on a facing of the card device, and cii) user information associated with the card device, and
wherein the fourth set of codes are further configured to cause the computer to receive the first NFT-related information from the card device by at least one of (i) reading the computer-readable indicia displayed on the facing of the card, and (ii) reading the user information from an embedded chip or magnetic strip of the card device.

18. The computer program product of claim 16, wherein the computer-readable medium further includes:
a seventh set of codes for causing a computer to, in response to issuing the card device to the user, generate a second non-fungible token (NFT) that is (i) associated with identification of the user and (ii) linked to the first NFT;
an eighth set of codes for causing a computer to communicate the second NFT to the distributed trust computing network;
a ninth set of codes for causing a computer to, in response to the distributed trust computing network receiving the second NFT, (ii) verify the authenticity of the second NFT by a consensus of decentralized nodes of the distributed trust computing network reaching a consensus on the second NFT and (ii) generate a data block, within the distributed ledger, that stores the verified second NFT;

a tenth set of codes for causing a computer to receive, at the resource event apparatus, second NFT-related information from the user;

an eleventh set of codes for causing a computer to, in response to determining that the first NFT-related information matches the first NFT stored on the distributed ledger of the distributed trust computing network, determine that (i) the second NFT-related information matches the second NFT and (ii) the second NFT is linked to the first NFT; and a twelfth set of codes for causing a computer to, in response to determining (i) and (ii), authorize the user to conduct resource events at the resource event apparatus using the card device.

19. The computer program product of claim 18, wherein the computer-readable medium further includes:

a thirteenth set of codes for causing a computer to communicate resource event-related information to the distributed trust computing network, wherein the resource event-related information includes at least (a) the first NFT-related information and the second NFT-related information, (b) card device authentication approval/denial status, (c) user authentication approval/denial status, and (d) resource event approval/denial status;

a fourteenth set of codes for causing a computer to, in response to the distributed trust computing network receiving the resource event-related information, (i) verify the authenticity of the resource event-related information by a consensus of decentralized nodes of the distributed trust computing network reaching a consensus on the resource event-related information, and (ii) generate a data block, within the distributed ledger, that stores the verified resource event-related information and is linked to the first NFT.

* * * * *